METHOD OF PRODUCING A SOLVENT-RESISTANT PATTERN USING DEVELOPED ELECTROSTATIC IMAGE FORMATION TECHNIQUES

Filed Sept. 2, 1960

INVENTOR.
NIKOLAUS E. WOLFF
BY
W.S. Hill
AGENT 3,226,227
Patented Dec. 28, 1965

3,226,227

METHOD OF PRODUCING A SOLVENT-RESISTANT PATTERN USING DEVELOPED ELECTROSTATIC IMAGE FORMATION TECHNIQUES

Nikolaus E. Wolff, Princeton, N.J., assignor to Radio Corporation of America, a corporation of Delaware Filed Sept. 2, 1960, Ser. No. 53,783
7 Claims. (Cl. 96—1)

This invention relates generally to improved methods of and articles useful in making patterns of solvent-resistant material on a substrate, and, more particularly to such a method in which the solvent-resistant material is a resin capable of being rendered more insoluble by a cross-linking action initiated by a particular rise in temperature.

A number of different processes have been previously available for producing patterns of etch-resistant material on a substrate. One of these is a so-called silk-screen printing method in which the pattern to be reproduced is made up in the form of a printing screen with open areas and closed areas. A relatively insoluble resin is forced through the open areas of the screen onto the substrate. This method is simple and direct but is not practical where large numbers of different patterns must be deposited.

Various photographic processes have also been in use. Most of these involve laying down a layer of material which becomes insoluble when exposed to light within some range of wavelengths, exposing the layer of such light through a negative of the pattern to be reproduced and then removing the material from the unexposed areas. Although this method has many advantages, it requires rather lengthly exposure to strong illumination, usually ultraviolet.

There are now known a number of synthetic resins capable of being converted from a relatively soluble state to a relatively insoluble state by a cross-linking action. In some cases, the cross-linking action takes place only in the presence of particular catalysts. In other cases, no catalyst is required. Where the cross-linking action is brought about by an increase in temperature within a range which is substantially above room temperature, the materials are of interest in the present invention.

An object of the present invention is to provide an improved method of laying down a predetermined pattern of insolubilized, cross-linked synthetic resin on a suitable substrate.

Another object is to provide an improved method of making an etch-resistant pattern on an etchable substrate.

A further object of the invention is to provide an improved method of insolubilizing desired areas of a cross-linkable resin layer.

A still further object is to provide novel plates usable in the above referred to processes.

The above objects and others are accomplished, in the present invention, by providing on a suitable substrate a layer of a resinous material which is relatively soluble but is capable of further reaction which renders it more insoluble by a cross-linking action initiated by a certain temperature increase. The areas of the layer which are to be rendered more insoluble are covered with a material which is a substantially better absorber of infra-red energy than is the resin. This material may be a readily fusible powder or printing ink. In one embodiment of the invention, the powder may be deposited by an electrostatic attraction method. The resin layer and infra-red absorber are then exposed to sufficiently intense infra-red energy to raise only those portions of the resin layer underlying the absorber substance to the particular desired temperature which causes the further cross-linking, insolubilizing reaction desired. After the desired portions have been rendered insoluble, the unreacted parts of the resin layer are removed.

The invention will be further explained with reference to the accompanying drawing, wherein.

Figures 1, 2, 3, 4, 5, 6, 7, 8:
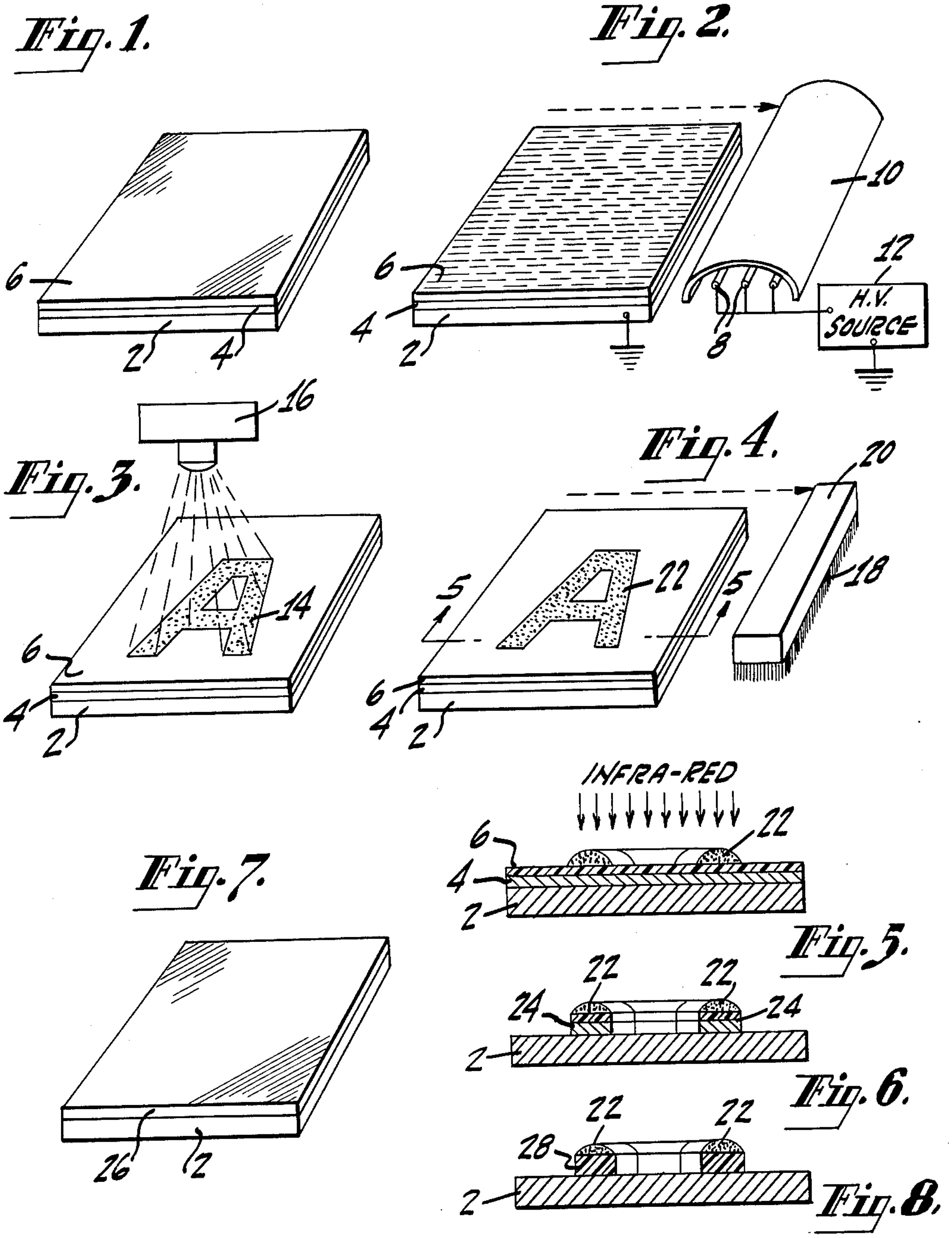
FIGS. 1–4 are perspective views illustrating successive steps in an example of a method in accordance with the present invention.
FIG. 5 is a cross section view taken along the line 5—5 of FIG. 4, illustrating a further step in the method.
FIG. 6 is a view similar to that of FIG. 5, illustrating a final step in the method; and, FIGS. 7 and 8 illustrate the initial and final steps in an alternative embodiment of the method.

Since the method of the invention has particular utility in the preparation of printing plates by an electrostatic deposition method, the invention will first be illustrated with an example of this type of process.

*Example I*

A photosensitive plate of the type usable in an electrostatic deposition process was first prepared by coating a metal plate as follows;

A zinc plate 2 (FIG. 1) was coated with the following solution.

| | Parts by wt. |
|---|---|
| Diallyl phthalate resin (such as "Dapon"-Food Machinery and Chemical Corp.) | 2.0 |
| Benzoyl peroxide | 0.04 |
| Toluene | 49.0 |
| Methyl ethyl ketone | 48.0 |

This solution was spin-coated on the zinc plate and, when dried by evaporation of the solvents, formed a coating layer 4 on the metal surface. This first coating was then covered with a second coating 6 made up of a photoconductive zinc oxide dispersed in an insulating resin binder. The composition of this second coating was 9.6 g. silicone resin of the alkyl-aryl type (G.E. No. 81,182), 24 g. white C.P. zinc oxide (as made by a dry process and having a relatively long dark decay characteristic and a surface photoconductivity greater than about $10^{-9}$ ohm$^{-1}$/square/watt/cm.$^2$ at about 3900 A.), and 22.5 g. toluene. This coating was also dried by evaporation of the solvent. The combined thickness of both coatings was about 0.2 mil. Many other electrically insulating synthetic resins may be used instead of the silicone resin mentioned, for example, polystyrene, polyvinyl acetate, cellulose ethers and esters, etc.

The coated plate, prepared as described above, was then utilized in the following manner to receive a visible image or pattern.

As illustrated in FIG. 2, the layer 6 is provided with an overall negative electrostatic charge by passing it, in the dark, past an electrostatic corona charging device. The charging device may comprise an array of fine wires 8 mounted within a grounded shield 10 and supplied with a 6000 v. D.-C. voltage source 12. The wires are maintained at a potential of 6000 v. negative with respect to ground.

The next step in the process is to discharge selected parts of the charge so as to produce a charge pattern corresponding to the final visible image desired. As illustrated in FIG. 3, this may be done by focussing on the layer 6 a light image 14 projected from an optical projector 16. The dark portions of the image preferably correspond to those parts of the image to be retained in the final pattern. The negative charge is lowered or removed from the light portions of the projected image. Exposure may be accomplished in a fraction of a second.

The next step in the process is to develop the electrostatic image. This may be done by brushing across the surface of the layer 6 a mixture 18 of a low melting point resin and powdered iron held by a bar magnet 20, as shown in FIG. 4. If the resin is of the type which acquires a positive electrostatic charge, it deposits on the negatively charged portions of the electrostatic image to form a visible powder image 22. It is possible, however, to select a negatively charged developer powder which will form a reversal print.

A suitable example of a positively charged resin can be made by preparing a mixture comprising 200 g. of 200 mesh Piccolastic resin No. 4358 (an elastic thermoplastic resin composed of polymers of styrene, substituted styrene and its homologs, marketed by the Pennsylvania Industrial Co., Clairton, Pa.), 12 g. of Carbon Black 6, marketed by the Eimer and Amend Co., New York, N.Y., and 12 g. of Spirit Negrosine S.S.B., marketed by the Allied Chemical and Dye Co., New York, N.Y. These ingredients are thoroughly mixed in a stainless steel container at about 200° C. The mixing and heating should be done in as short a time as possible. The melt is poured on a brass tray and allowed to cool and harden. The hardened mix is then broken up and ball milled for about 20 hours. The milled powder is screened through a 200 mesh screen and is then ready for use as a developer powder. This powder takes on a positive charge when mixed with iron powder. It therefore develops an electrostatic image composed of negative charges. Two to four g. of the developer powder and 100 g. of iron powder are blended to make up the completed developer mix.

As illustrated in FIG. 5, the next step in the process is to expose the unfixed powder image to infra-red energy. Exposure to strong infra-red for several minutes fuses the developer powder to the coating and the dark areas covered with the developer powder absorb a greater proportion of the infra-red than the areas not so covered. The covered areas are thus raised to a higher temperature. The rise in temperature and the presence of the peroxide catalyst causes a cross-linking action to occur within the diallyl phthalate resin beneath the powder covered areas. The cross-linking action causes hardening or curing of these portions of the resin making them more solvent-resistant.

The final step, as shown in FIG. 6, is to remove all areas of the phthalate resin and overlying zinc oxide-silicone composition where the phthalate resin has not been hardened. This may be done by washing the plate with a solvent mixture composed of equal parts by volume of toluene and methyl ethyl ketone leaving raised portions 24 on the zinc plate. Although the silicone resin is not hardened by the temperature rise during the step of exposure to infra-red energy, it is sufficiently protected by the overlying insoluble fused developer powder that, in the thin layers used, it is not washed away by the solvent in those areas overlain by the powder.

If the plate, which has been made as described, is to be used as a printing plate in a photo-offset printing process, it can then be etched with acid in the usual fashion. The resin-covered areas are acid-resistant.

There are a number of variations possible in the methods of the invention. One of them is to utilize a single layer of resinous composition containing both the cross-linkable resin and the photoconductive substance instead of separate layers of these materials. The following is an example of the method using a single-layer composition.

*Example II*

A coating solution was prepared having the following composition:

| | Parts by wt. |
|---|---|
| Photoconductive zinc oxide | 8.0 |
| Diallylphthalate resin (as in Example I) | 4.8 |
| Dicumyl peroxide | 0.1 |
| Toluene | 6.1 |
| Methyl ethyl ketone | 6.0 |

A zinc printing plate was dip-coated with this composition so that, as illustrated in FIG. 7, the completed plate comprised the zinc plate 2 having a single layer of coating 26. The plate was thoroughly dried and then subjected to the same processing steps as in the previous example, illustrated in FIGS. 2–6. However, before exposing to infra-red, the plate was pre-heated to 100° C. in order to shorten the exposure time. After exposure, the plate was washed in a mixture of equal parts by volume toluene and acetone leaving raised portions 28 (FIG. 8) corresponding to the image desired. In this example the dicumyl peroxide is a catalyst aiding the cross-linking reaction in the phthalate resin.

Another variation is to use, either in a composite layer of cross-linkable resin-photoconductor or in separate layers of these two materials, a type of resin which undergoes cross-linking when its temperature is raised by a particular amount, no catalyst or other reactant being needed. The following is an example using this type of resin.

*Example III*

A solution was prepared of an incompletely polymerized (non-crosslinked) urea formaldehyde resin in butanol. The solution contained 6% by weight of the resin. A thin coating of this solution was applied to a zinc plate and dried for 10 minutes at 65° C. This first coating was then covered with a second coating of photoconductive zinc oxide in a silicone resin binder as in Example I.

The plate was then processed to obtain a visible image as in Example II except that pre-heating prior to exposure to infra-red was to 120° C. After exposure to infra-red, the uncured portions of the coating were removed by first washing in toluene and then rinsing in equal parts by volume of butanol and ethanol.

A further variation of the process is to use two resins which become cross-linked by reaction together. This variation also can be used as a single layer or two-layer process.

*Example IV*

A coating composition was made up of the following:

3.5 parts by wt. epoxy resin having an epoxy number of 1600–1900 and a hydroxyl number of 190
1.5 parts by wt. of a melamine-formaldehyde resin
14 parts by wt. butanol
81 parts by wt. xylene This composition was applied as a thin coating to a zinc plate and dried at 100° C. for 10 minutes. As in Example I, this dried coating was covered with a second layer containing photoconductive zinc oxide and a silicone resin binder. After processing to form a visible powder image as in the previous examples, the plate was exposed to infra-red for a few minutes to make the image areas solvent resistant. The uncured areas of the coating were then removed with a mixture of equal parts by volume of xylene, butanol and methyl ethyl ketone.

Still another variation of the process utilizes a mixture of resins which undergo a cross-linking reaction in the presence of a catalyst when the temperature of the mixture is raised by a certain amount. This is illustrated in the following example.

*Example V*

A 40% by weight solution in toluene was made up of a terpolymer comprising 30 mol percent butyl methacrylate, 10 mol percent glycidyl methacrylate and 60 mol percent acrylonitrile. Ten parts by weight of the terpolymer solution were then mixed with a solution comprising 90 parts by weight methyl isobutyl ketone and $6.3\times10^{-3}$ parts by weight syrupy phosphoric acid. The ketone and acid must be mixed together prior to adding the terpolymer solution to assure a stable solution. A zinc plate was coated with this solution as described in Example I and, after drying, a second coating of photoconductive zinc oxide and silicone resin binder was applied as also described in the first example.

After drying, the plate was processed to produce a visible powder image as previously described and then exposed to infra-red to harden the areas beneath the powder image. After hardening, the uncured areas of the plate were removed with a 1:1 by volume mixture of toluene and isobutyl ketone.

Although only a few different resins have been mentioned in the examples, it is evident that these may be replaced by several different classes of resins each containing many individual members. One of the classes, for example, is the double-bond containing soluble polymers or pre-polymers. An example of a resin already given, in this class, is diallyl phthalate. But, other members, such as butadiene-styrene copolymers and acrylonitrile-butadiene copolymers can also be used. Some of these resins require the presence of a catalyst to effect cross-linking action and others do not. Some catalysts, in addition to those already mentioned, are benzaldehyde peroxide, p-chloro benzoyl peroxide, t-butyl pentamethyl propyl peroxide, cyclohexanone peroxide, t-butyl perbenzoate and α,α-azo bis(α-methylbutyronitrile).

Another type of reactive-group containing polymer which is suitable is the epoxy-type resin. Almost any of these having the structure

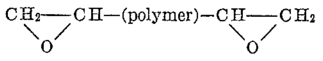

can be used.

This type of resin can be cured by incorporating a base or an acid precursor which will generate either a diamine or diacid, with or without a catalyst, on heating. "Acid" or "base" in this case means generating an "active hydrogen" or substantially incorporating methylol groups, fatty acids, acid anhydrides, or organic nitrogen compounds.

Some epoxide resins can be copolymerized with almost any vinyl type monomer such as styrene, acrylates, methacrylates, vinyl chlorides, acrylonitrile, etc.

Another type of resin that can be used is the isocyanate prepolymer or hydroxy end-group prepolymer which is curable by reacting with an isocyanate. These polymers can be hydroxy-containing prepolymers that have —OH groups other than at the end of the chain. These can react with diisocyanates or diisocyanate precursors to form chain extended and cross-linked themosetting resins. The base polymer can be of the polyester, polycarbonate or polyether type. The diisocyanate precursor can be a variety of compounds that will form a reaction species on heating with or without a catalyst.

Still another variety of resin that may be used is the urea-formaldehyde or melamine-formaldehyde type. Any of these which is non-tacky in its uncured form can be used. Examples are the "Uformite" (Rohm and Haas) and polyvinyl butyral resins.

The examples of resins and resin types that have been given are merely illustrative of a much larger list of those suitable in the present invention. Additional examples will be readily apparent to those skilled in the art.

When a layer containing photoconductive zinc oxide is used, the proportion of zinc oxide to resin binder may vary over a rather wide range. It is preferred, however, to use about 50–90% by weight zinc oxide and 50–10% resin.

The infra-red absorbing substance may be almost any easily fusible dark-colored material compatible with the ingredients of the coating. The low-melting synthetic resins are preferred. Where the deposition of this material is effected electrostatically, the material must, of course, also be capable of taking on the desired electrostatic charge.

The substrate used may be metal or, if it is desired to make a transparency, glass coated with a transparent conductive coating, such as tin oxide, may be used.

Although, in the preferred form of the invention, it is desired to use a photoconductive insulating layer and an electrostatic deposition method to deposit a so-called developer powder on those areas which are to be included in the resist pattern, it is also possible to carry out a form of the process in which the photoconductive substance is omitted. Thus, it is possible to merely provide the substrate 2 with a single layer 4 of resin-catalyst mixture as in Example I, apply the "developer" as particles or printing ink 22 by some suitable method as through a stencil or letter press or offset printing, and then expose to infra-red and wash as set forth in the various examples. As in the other embodiments of the invention which have been described, the resin may be one which requires a catalyst to enable it to undergo a cross-linking reaction when its temperature is raised, or it may be one requiring no catalyst or other reactant.

What is claimed is:

1. A method of forming a resinous pattern of predetermined configuration on a substrate comprising: forming on said substrate a coating of a solvent soluble polymer resin capable of further reaction which renders it substantially insoluble in said solvent by a cross-linking action initiated by a certain temperature increase, depositing on certain areas of said coating a fusible material which is a substantially better absorber of infra-red energy than said resin, directing sufficient infra-red energy to said certain areas so that only the coating at said areas is subject to said certain temperature increase, and, after sufficient further reaction forming an insoluble resin has occured in said certain areas, removing those parts of said resin coating not subject to said temperature increase.

2. A method of forming a resist pattern on a substrate comprising, depositing on said substrate a coating comprising (1) a solvent soluble polymer resin capable of further reaction which renders said resin substantially insoluble in said solvent by a cross-linking action initiated by a certain temperature increase and (2) photoconductive zinc oxide, providing the surface of said coating with an overall electrostatic charge, exposing said charged surface to a light image of said pattern such that charged areas of said surface remain which correspond to said pattern, depositing only on said charged areas particles of a fusible, electroscopic powder which is a substantially better absorber of infra-red energy than is said coating, directing sufficient infra-red energy to the powder covered areas such that only the coating at said areas is subject to said certain temperature increase, and, after sufficient further reaction forming an insoluble resin has occurred in said certain areas, removing those parts of said resin coating not subject to said temperature increase.

3. A method according to claim 2, in which said resin and said zinc oxide are in separate strata of said coating.

4. A method according to claim 2, in which said resin and said zinc oxide are in the same stratum of said coating.

5. A method according to claim 2, in which said coating includes a polymerization catalyst for said resin.

6. A method according to claim 2, in which said powder comprises a dark colored synthetic resin.

7. A method of making an etched pattern comprising: forming a resinous pattern of predetermined configuration on an etchable substrate by forming on said substrate a coating of a solvent soluble polymer resin capable of further reaction which renders it substantially insoluble in said solvent by a cross-linking action initiated by a certain temperature increase, depositing on certain areas of said coating a fusible material which is a substantially better absorber of infra-red energy than said resin, directing sufficient infra-red energy to said certain areas such that only the coating at said areas is subject to said certain temperature increase, after sufficient further reaction forming an insoluble resin has occurred in said certain areas, removing those parts of said resin coating not subject to said temperature increase, and then etching those parts of said substrate from which the resin coating has been removed.

References Cited by the Examiner

UNITED STATES PATENTS

| | | | |
|---|---|---|---|
| 2,297,691 | 10/1942 | Carlson | 96—1 |
| 2,764,085 | 9/1956 | Shoemaker et al. | 101—149.2 |
| 2,808,777 | 10/1957 | Roshkind | 96—27 |
| 2,857,271 | 10/1958 | Sugarman | 96—1 |
| 2,875,054 | 2/1959 | Griggs et al. | |
| 2,893,868 | 7/1959 | Barney | 101—401.1 |
| 2,939,787 | 6/1960 | Giaimo. | |
| 2,940,848 | 6/1060 | Kostelec et al. | |
| 2,947,625 | 8/1960 | Bertelsen | 96—1 |
| 2,959,481 | 11/1960 | Kucera. | |
| 2,990,279 | 6/1961 | Crumley et al. | |
| 3,072,742 | 1/1963 | Block. | |

OTHER REFERENCES

Hansen et al.: Principles of Color Photography, Wiley, 1953; ch. VII is of interest.

NORMAN G. TORCHIN, *Primary Examiner.*

PHILIP E. MANGAN, *Examiner.*